Patented June 13, 1939

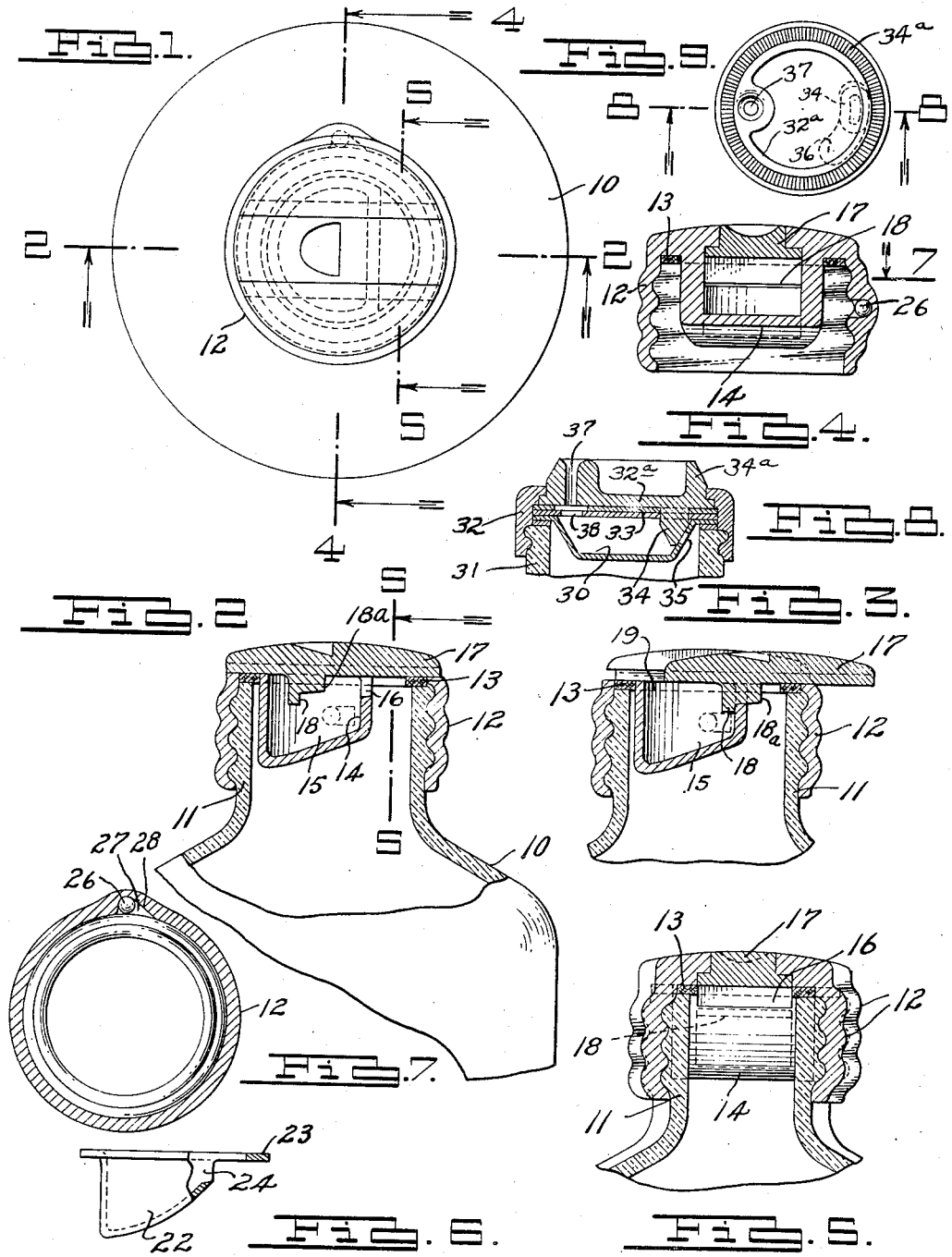

2,162,068

UNITED STATES PATENT OFFICE 2,162,068

MEASURING CLOSURE FOR CONTAINERS

Edith Brisbane Duell and Charles Holland Duell, Hartford, Conn.

Application February 15, 1937, Serial No. 125,677

19 Claims. (Cl. 221—147)

This invention relates to devices for the convenient measuring and simultaneous dispensing, i. e., the dealing out in portions, of various materials capable of flowing or pouring, such as liquid medicines, tooth powders, baking, headache and other powders, which are directed to be used in accurately measured quantities.

Large quantities of liquid or powdered material that will pour are sold annually in bottles or other containers from which measured portions or quantities are directed to be used in order to obtain satisfactory results. It is therefore usually necessary at the time of use to have some additional apparatus, such as a spoon or glass, at hand to measure the quantity which should be used.

In United States Letters Patent No. 2,021,444, issued to Charles H. Duell, is disclosed broadly a device for accomplishing the above object but in which the measuring means is incorporated in the construction of the main container for the material to be dispensed.

The present invention has for its principal object to provide means whereby the measuring device is more universally applicable in that no special construction of the main container is necessitated but the measuring device is incorporated in a closure member that may be readily fabricated for containers of many different types.

It is a further object to provide a closure member for use with so-called screw-top containers which will have incorporated therein a measuring receptacle, said receptacle having a communicating passage to the container so positioned that a definite quantity of liquid is admitted to the receptacle and segregated for pouring from the container.

It is an additional object to provide a closure for a container having a positive means to secure the closure to the container which also serves to secure positively the cover of the measuring receptacle associated with such closure to the container, thereby insuring against leakage.

It is still a further object to provide a type of measuring means or device for use with a standard container which will be adaptable for use with containers of various sizes, each of said means serving not only as a measuring device but also as a closure for such container.

Another object is to provide a type of closure for containers incorporating a measuring device as aforementioned and having combined therewith means to prevent subsequent removal of the closure from the container without mutilation of parts of the container or closure. The use of such a closure renders the container non-refillable by any practical means.

For the purpose of the present application my invention has been described and illustrated as applied to a closure member or cap for a screw top type of bottle, large numbers of which are used for many different types of both liquid and powdered preparations.

The above and other objects of the invention will appear more fully from the following detailed description of one possible embodiment of the principle of the invention which has been selected for purposes of illustration, and by reference to the accompanying drawing forming a part hereof and wherein:

Fig. 1 shows a top view of the closure member assembled to a container, such as a bottle.

Fig. 2 is a section taken on the line 2—2 of Fig. 1 and shows the relative location of the closure member, the movable cover and the measuring receptacle, the movable cover being in the closed position.

Fig. 3 is a view similar to Fig. 2 but in this view the cover member is moved to the open position such as would be used when the measured quantity of liquid was ready to pour.

Fig. 4 is a section taken on the line 4—4 of Fig. 1 and shows a section through the closure member and the measuring receptacle showing the integral construction of these parts.

Fig. 5 is a section taken on the line 5—5 of Figs. 1 and 2 and shows the communicating opening between the container proper and the measuring receptacle and shows a general view of the receptacle and closure members.

Fig. 6 shows a modified form of a measuring receptacle which may be used, such a receptacle being adapted to clamp between the top of the container and the closure member.

Fig. 7 is a horizontal section through the container and closure on line 7 of Fig. 4. The section shows a means to prevent removal of the closure after initial assembly thereof.

Fig. 8 is a vertical section corresponding to the showing in Fig. 2, but disclosing a modified form of construction wherein a rotatable instead of a straight sliding cover is employed.

Fig. 9 is a top view of the construction shown in Fig. 8.

Referring to the drawing, reference character 10 indicates a container such as a bottle or other type commonly used. A circular neck 11 of the bottle 10 is provided with threads as shown in Fig. 2 and is, therefore, adapted to be closed by closure member 12 which screws in place in a conventional manner. A sealing washer or gasket 13 may be provided between the top edge of the bottle opening and the closure member. It is preferable, in the form of invention selected for illustration, that the closure member 12 be made of such material that the closure may readily be molded and preferably have formed integral therewith a partition wall 14, which projects downwardly from the inner or lower face of the closure into the neck of the container and which wall defines a measuring receptacle 15. This receptacle is closed on three of its sides by the wall 14 and the top of the closure but on one side the wall 14 terminates short of the top to provide an opening 16 as shown in Fig. 5.

A sliding cover 17 is mounted to slide in grooves formed in the top of the closure member as shown in Figs. 2, 3 and 4. A downwardly extending projection 18, formed on the lower side of the sliding cover, as shown in Figs. 2 and 3, is of such length as to contact the upper edge of the wall 14 adjacent the opening 16, the transverse width of the projection or lip 18 being slightly greater than the width of the opening 16, so that when the sliding cover 17 is moved to the position shown in Fig. 3, the opening 16 will be closed to seal or segregate the receptacle 15 from communication with the remainder of the container. The lower edge of the projection 18 preferably projects below the edge of the opening 16 and is provided with a portion 18a having its lower face tapered to engage said edge with a wedging action, thus not only effectively sealing, but also locking the cover when it is in opened position. The portion 18a is so located and proportioned relative to an opening 19 in the top wall of the closure that when the cover 17 is moved toward its opened position shown in Fig. 3 said portion 18a will enter the opening 16 just before the opening 19 is uncovered.

It is to be noted that the sliding cover 17 is flush with the lower face of the closure member and contacts the washer 13 so that when the closure member is tightened against the top of the bottle the cover 17 will also be tightly gripped against the top of the grooves (see Fig. 4) which will not only hold the cover 17 rigidly in place, but will also seal the bottle against leakage either through the screw threads or through the sliding cover.

In the operation of the device the closure 12 is first loosened slightly and the bottle tilted so that a quantity of liquid or other material is allowed to flow into the receptacle 15 through the opening 16. With the bottle in an upright position, the cover 17 is then moved from the position shown in Fig. 2 to the position shown in Fig. 3 so that the receptacle 15 will be sealed from communication with the remainder of the container by the projection 18 and its extension 18a, hence a measured quantity of the material is retained within the receptacle. The bottle can then be tilted to pour such measured quantity of the liquid or other material from the opening made available and as the cover will remain in position due to the wedging action of the lip, only one hand of the user will be needed to hold the container and pour the material from the receptacle.

For the purpose of attaining all the practical advantages of a non-refillable container I have shown a construction in Figs. 4 and 7 which prevents removal of the closure after initial assembly. In the specific embodiment illustrated suitable interlocking means in the form of a ball 26 (Fig. 7) is carried in a recess 27 provided in the closure so that when the closure is screwed down the ball moves toward the larger end of the recess but when an attempt is made to unscrew the closure the ball rolls onto the tapered portion 28 and securely prevents sufficient turning of the closure in a direction to effect removal of the closure while permitting a desired limited movement for the purpose of loosening the closure to release the cover 17 for use as previously mentioned.

It is noted that it is the combination of the locking feature of the closure with the measuring device which has the rather unobvious result of rendering the container usable as a practical non-refillable unit. In this connection it is obvious that considerable variation may be made in the details of the locking means used without change in the fundamental idea.

Although it is intended that the non-refillable feature can be made available by the use of the additional parts above mentioned, it is understood that a closure can be constructed without the locking device and the advantages of the measuring device attained with a removable closure.

In Fig. 6 there is shown a possible modification of the receptacle in a separate formed member 22 which has a flange 23 adapted to extend around the top of the bottle in contact with a sealing means such as washer 13. The closure member with its sliding top 17 could then be screwed in place and would hold the member 22 in position. An opening 24 is provided similar to the opening 16 and the unit could be made adaptable to operate with a projection similar to 18 on the sliding cover 17. The advantage of this separate type of receptacle is that various sizes may be provided and made quickly interchangeable when various quantities are desired.

It will be understood that the receptacle 15 may be made of any size to hold any desired measured quantity such as a teaspoonful or a half teaspoonful, or if the material to be used should be measured by weight, the receptacle can readily be proportioned according to the weight of the material to be dispensed.

In a modified form of the invention shown in Figs. 8 and 9 receptacle 30, which may be either a separate member of the general type shown in Fig. 6, or which may be of the general type shown in Figs. 1 to 5, is inserted in the top of the bottle neck or other container opening 31 and by suitable gaskets or other sealing washers is held in place by a screw type closure member 32. Directly contacting the flanged edges of the receptacle 30 is a disc shaped member 33 which fits inside the top of the closure member 32. A circular shaped cover member 32a fits inside closure 32 and has two projections, a lower extending projection 34 of such length and shape as to cover and close an opening 35 in the side of the receptacle 30, and an upwardly extending projection 34a which extends through the closure member and enables the cover 32a to be rotated through an arc allowed by the length of a slot 36 provided in disc 33. When the cover 32a is rotated to one extreme position the lower extending projection 34 covers the opening 35 to close the receptacle 30 from communication with the interior of the container. There is also provided in the top of the rotatable cover an opening 37 so positioned relative to an opening 38 in the disc 33 that when the lower projecting member closes the opening 35 in the receptacle 30, the opening 38 in the cover is aligned with the opening 37 in the disc thereby allowing the measured amount of liquid in the receptacle to be poured out through the aligned openings 37 and 38. When the cover is rotated to the opposite position the openings 37 and 38 are out of alignment and the opening to the outside therefore closed, while the projection 34 uncovers the connecting opening 35 from the container to allow the receptacle to be filled.

It is understood that various other changes and modifications may be made without departing from the general principles of the invention. It is particularly to be noted that the form of the receptacle and the location and shape of the closure member may be changed to adapt it for use in various forms of containers.

It will also be readily understood that as the measuring device is fully incorporated into the construction of the closure, the closures may be constructed and sold separately from the containers so that a stock of closures adapted to fit standard containers and having receptacles of different sizes and capacity may be placed on the shelves of a shopkeeper. Obviously, when the non-refillable feature is not incorporated the closures may be removed from the containers and re-used on fresh containers when the material in an old container has been completely used.

It will be further understood that the invention is not to be considered as limited to the specific constructional details herein described and illustrated but that such disclosure is merely illustrative of one of the many forms in which the invention may be incorporated, for example, while the invention has been shown and described for use in connection with a screw top type of closure, obviously the invention is not limited to use with this specific type of fastening means on the closure as it is equally adaptable for use with a clamp or any other well known type of closure securing means, and could also be incorporated in a mere frictional type of closure. Also the invention is not limited to use with a bottle as shown but may be adapted for use with any shape or size of container irrespective of whether the same is constructed of glass, metal, or any other material.

Likewise while I have described the measuring receptacle as constructed integral with the closure in the form shown in Figs. 1 to 5 inclusive, it may be desirable for convenience of manufacture to make the receptacle as a separate member or a plurality of parts constructed of any suitable material and to secure the same to the closure by cementing or in any other suitable way.

The ball 26 shown in Fig. 7 is but illustrative of many different types of interlocking devices that may be employed for permitting movement of the closure to sealing position while preventing removal thereof.

We claim:

1. The combination with a container of a closure for said container, a removable measuring receptacle located adjacent said closure, said receptacle having an opening communicating with the interior of said container, a movable exterior cover element carried by said closure and adapted to cover said receptacle, and a member projecting from said cover element having a closure portion extending parallel to the direction of movement of said cover element of such shape and position as to close said communicating opening whenever there is any opening of said cover to allow pouring of material from said measuring receptacle.

2. The combination with a container of a screw-type closure for said container, a removable measuring receptacle located adjacent said closure, said receptacle having an opening communicating with the interior of said container, a movable cover element carried by said closure and adapted to cover said receptacle and to project over the edge of said container in its closed position, and a member projecting from said cover element having a closure portion extending parallel to the direction of movement of said cover element of such shape and position as to close said communicating opening whenever there is any opening of said cover to allow pouring of material from said measuring receptacle.

3. The combination with a container of, a screw-type closure for said container having a measuring receptacle secured thereto with an opening communicating with the interior of said container, a movable exterior cover element carried by said closure and adapted to cover said receptacle, and a member projecting from said cover element having a closure portion extending parallel to the direction of movement of said cover element of such shape and position as to close said communicating opening whenever there is any opening of said cover to allow pouring of material from said measuring receptacle.

4. The combination with a container having a circular opening, a screw-type closure for said container having a surface adapted to exert pressure against said circular opening, a measuring receptacle having a circular flange adapted to be gripped between said closure and said circular opening, said receptacle having an opening communicating with the interior of said container, a movable cover element carried by said closure adaptable to cover said receptacle, and a member projecting from said cover element having a closure portion extending parallel to the direction of movement of said cover element of such shape and position as to close said communicating opening whenever there is any opening of said cover to allow pouring of material from said measuring receptacle.

5. The combination with a container of, a removable measuring receptacle suspended in said container having communicating opening into said container, a closure member for said container, a movable exterior cover element carried by said closure and adapted to cover said receptacle, and a member projecting from said cover element having a closure portion extending parallel to the direction of movement of said cover element of such shape and position as to close said communicating opening whenever there is any opening of said cover to allow pouring of material from said measuring receptacle.

6. A closure for a fluid container characterized by a measuring receptacle formed integral with said closure and having an opening communicating with the interior of said container at a position to allow retention of a measured quantity of fluid in said receptacle when said container is in an upright position, and a sliding cover member mounted on said closure to cover said receptacle in closed position and to close said communicating opening whenever there is any opening of said cover to allow pouring of a measured quantity of material from said receptacle.

7. The combination with a container having an opening with a circular edge of a closure member adapted to enclose said edge, a measuring receptacle having a laterally extending flange adapted to be retained on said edge said receptacle having an opening communicating with the interior of said container at a position to allow retention of a measured quantity of fluid in said receptacle when said container is in an upright position, and a top closure shaped to contact said flange and to hold the same between said top closure and the said circular edge of said container.

8. A container of the type having a screw closure member characterized by, a removable receptacle projecting into said container, said receptacle having a connecting opening between said receptacle and interior of said container at a position to allow retention of a measured quantity of fluid in said receptacle when said container is in an upright position, a movable cover associated with said closure member operable to open said receptacle and close said connecting opening, and means to prevent removal of said closure from said container.

9. The combination with a container of, a measuring receptacle secured in said container, a closure for said container adapted to secure said measuring receptacle in said container, a sliding cover member carried by said closure adapted to cover said receptacle and secured in position when said closure is entirely assembled to said container, means to prevent removal of said closure from said container so constructed as to allow limited movement to release said sliding cover for operation.

10. A non-refillable closure for a container having a barrier projecting from the lower face of said closure into the interior of said container and terminating at one point short of said lower face to leave an opening, a movable cover mounted on said closure for movement from an open to a closed position, having a projection with an extension parallel to the direction of movement of said movable cover for closing said opening whenever said cover is moved to an open position and said closure being provided with a second opening which is opened when said cover is moved to its open position and means for locking said closure to said container to prevent removal thereof, the first of said openings permitting the contents of said container to flow from said container past said barrier and the second of said openings permitting the contents to be poured from said container, and said projection serving to seal the first of said openings to prevent said container from being filled when said cover is in its opened position.

11. The combination with a container of a screw type closure therefor having a barrier projecting into said container, said closure having an opening in the top thereof and a movable cover for opening and closing said opening, said barrier being provided with an opening through which the contents of said container may flow around said barrier towards the opening in said closure, said movable cover being provided with means to seal the opening in said barrier whenever said cover is moved to an open position and cooperating interlocking means on said container and said closure for permitting said closure to be screwed on to said container to seal the same by preventing removal of said closure from said container after it has been screwed into sealing position.

12. The combination with a container of a screw type closure therefor having a barrier projecting into said container, said closure having an opening in the top thereof and a movable cover for opening and closing said opening, said barrier being provided with an opening through which the contents of said container may flow around said barrier towards the opening in said closure, said movable cover being provided with means to seal the opening in said barrier when said cover is moved to open position, said means being so located on said cover as to close the barrier opening before said cover in its movement towards open position opens the closure opening, and cooperating interlocking means on said container and said closure for permitting said closure to be screwed on to said container to seal the same by preventing removal of said closure from said container after it has been screwed into sealing position.

13. The combination with a container of, a removable measuring receptacle suspended in said container and having a communicating opening into said container, a closure member for said container, a rotatable cover element carried by said closure, a projection on said cover having a beveled portion positioned to close said communicating opening in one position of rotating movement of said cover.

14. The combination with a container of, a removable measuring receptacle suspended in said container, a closure member for said container, a rotatable cover element carried by said closure, a wall of said receptacle having an arcuate portion concentric with the axis of rotation of said rotatable cover, and having a communicating opening to the container in said arcuate portion, and a projection on said rotatable cover member contacting said arcuate wall for opening and closing said opening on rotation of said rotatable cover.

15. In a container of the type having a screw closure member characterized by a removable receptacle projecting into said container, said receptacle having a communicating opening between said receptacle and the interior of said container, a movable exterior cover associated with said closure member, and a member projecting from said cover and having a laterally extending closure portion operable with movement of said cover to close said communicating opening whenever there is any opening of said cover to allow pouring of material from said receptacle.

16. A closure for a container characterized by a measuring receptacle formed integral with said closure and having an opening communicating with the interior of said container at a position to retain a measured quantity of fluid when said container is in an upright position, and a sliding cover for said receptacle having a laterally extending closure portion shaped and positioned to close said communicating opening of said receptacle at all times when there is any opening of said cover to allow pouring of a measured quantity of material from said receptacle.

17. The combination with a container having an opening in the upper portion thereof, of a closure for said container having a surface adapted to exert pressure against the edges of said opening, a measuring receptacle having a flange adapted to be gripped between said closure and the edges of said opening, said receptacle having an opening communicating with the interior of said container, a movable cover element carried by said closure adaptable to cover said receptacle, and a member projecting from said cover element having a closure portion extending parallel to the direction of movement of said cover element of such shape and position as to close said communicating opening whenever there is any opening of said cover to allow pouring of material from said measuring receptacle.

18. A closure for a fluid container characterized by a measuring receptacle positioned adjacent thereto having an opening communicating with the interior of said container at a position to allow retention of a measured quantity of fluid in said receptacle when said container is in an upright position, and a sliding cover member mounted on said closure to cover said receptacle in closed position and to close said communicating opening whenever there is any opening of said cover to allow pouring of material from said receptacle.

19. A closure for a container characterized by a measuring receptacle adapted to be positioned adjacent said closure and having an opening communicating with the interior of said container at a position to retain a measured quantity of fluid in said receptacle when said container is in an upright position, and a sliding cover member for said closure and receptacle having a laterally extending closure portion shaped and positioned to close said communicating opening of said receptacle at all times when there is any opening of said cover to allow pouring of material from said receptacle.

EDITH BRISBANE DUELL.
CHARLES HOLLAND DUELL.